(12) United States Patent
Nerieri et al.

(10) Patent No.: US 9,578,128 B2
(45) Date of Patent: Feb. 21, 2017

(54) SYSTEMS AND METHODS FOR MESSAGE DELIVERY TO MOBILE DEVICES SUPPORTING MULTIPLE USERS

(71) Applicant: Google Inc., Mountain View, CA (US)

(72) Inventors: Francesco Nerieri, Santa Cruz, CA (US); Doru C Manolache, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 322 days.

(21) Appl. No.: 13/844,134

(22) Filed: Mar. 15, 2013

(65) Prior Publication Data

US 2014/0122624 A1    May 1, 2014

Related U.S. Application Data

(60) Provisional application No. 61/719,774, filed on Oct. 29, 2012.

(51) Int. Cl.
*H04L 29/08* (2006.01)

(52) U.S. Cl.
CPC ............. *H04L 67/306* (2013.01); *H04L 67/26* (2013.01); *H04L 67/327* (2013.01)

(58) Field of Classification Search
CPC .............................. H04L 67/306; H04L 67/327
USPC ....................................................... 709/206
See application file for complete search history.

(56) References Cited

U.S. PATENT DOCUMENTS

| | | | | |
|---|---|---|---|---|
| 5,700,712 | A * | 12/1997 | Schwalke | ........... H01L 21/2255 438/430 |
| 6,745,193 | B1 | 6/2004 | Horvitz et al. | |
| 7,451,190 | B2 * | 11/2008 | Szeto | ................... G06Q 10/109 709/206 |

(Continued)

FOREIGN PATENT DOCUMENTS

| | | |
|---|---|---|
| WO | 2012106411 A1 | 8/2012 |
| WO | 2014070744 A2 | 8/2014 |

OTHER PUBLICATIONS

PCT/US2013/067259 International Search Report and Written Opinion Mailed Mar. 3, 2014.

(Continued)

*Primary Examiner* — Patrice Winder
(74) *Attorney, Agent, or Firm* — Troutman Sanders LLP; James E. Schutz; Brennan M. Carmody

(57) ABSTRACT

The disclosed technology covers messaging systems and methods, and computer program products embodying such systems and methods. A computer program product may include a computer-readable storage medium with instructions executable by one or more processors to perform a method. The method may include receiving, at a message server configured to receive a plurality of messages for a plurality of computing devices, a first message intended for a first user profile. The first user profile and one or more other user profiles may exist on a single computing device. The method may also include receiving a first status update from the first computing device indicating that the first user profile is stopped or non-active, and postponing delivery of the first message to the first computing device, based on the first user profile being stopped or non-active. These and other aspects of messaging systems, methods, and computer program products are disclosed herein.

17 Claims, 4 Drawing Sheets

(56) References Cited

U.S. PATENT DOCUMENTS

| | | | |
|---|---|---|---|
| 7,454,781 B2* | 11/2008 | Tachizawa | H04L 12/581 726/3 |
| 7,522,910 B2 | 4/2009 | Day | |
| 8,295,860 B2* | 10/2012 | Iyer | H04W 52/0235 455/343.2 |
| 8,316,020 B1 | 11/2012 | Kleinmann | |
| 8,467,514 B1* | 6/2013 | Makhmudov | H04M 3/42365 379/201.07 |
| 8,699,413 B2 | 4/2014 | Ring et al. | |
| 8,817,963 B2* | 8/2014 | Makhmudov | H04M 3/42374 379/201.07 |
| 2002/0156889 A1 | 10/2002 | Crudele et al. | |
| 2002/0173308 A1 | 11/2002 | Dorenbosch et al. | |
| 2003/0065788 A1* | 4/2003 | Salomaki | H04L 12/581 709/204 |
| 2003/0153288 A1 | 8/2003 | Nakatsuyama | |
| 2004/0008619 A1 | 1/2004 | Doshi et al. | |
| 2005/0288001 A1* | 12/2005 | Foster | H04L 67/04 455/418 |
| 2007/0060174 A1* | 3/2007 | Newton | H04W 88/184 455/456.5 |
| 2007/0282959 A1* | 12/2007 | Stern | 709/206 |
| 2007/0294336 A1 | 12/2007 | Pounds et al. | |
| 2008/0214161 A1* | 9/2008 | Jakl | H04M 1/72572 455/414.2 |
| 2008/0243609 A1* | 10/2008 | Murto et al. | 705/14 |
| 2008/0301660 A1 | 12/2008 | Rao et al. | |
| 2008/0301667 A1 | 12/2008 | Rao et al. | |
| 2008/0301669 A1 | 12/2008 | Rao et al. | |
| 2008/0301672 A1 | 12/2008 | Rao et al. | |
| 2008/0318616 A1* | 12/2008 | Chipalkatti | H04W 12/08 455/550.1 |
| 2009/0113304 A1* | 4/2009 | Mercier et al. | 715/719 |
| 2009/0165145 A1 | 6/2009 | Haapsaari et al. | |
| 2010/0083255 A1* | 4/2010 | Bane et al. | 718/101 |
| 2012/0079045 A1* | 3/2012 | Plotkin | 709/206 |
| 2012/0117250 A1 | 5/2012 | Santamaria et al. | |
| 2012/0117568 A1 | 5/2012 | Plotkin | |
| 2012/0324041 A1 | 12/2012 | Gerber et al. | |
| 2013/0054701 A1 | 2/2013 | Leeder et al. | |
| 2013/0198299 A1 | 8/2013 | Chhaochharia et al. | |
| 2013/0331067 A1* | 12/2013 | Coussemaeker | G06Q 10/10 455/412.2 |
| 2014/0089193 A1 | 3/2014 | Boding et al. | |
| 2014/0113646 A1 | 4/2014 | Maggenti | |
| 2014/0349633 A1 | 11/2014 | Sajadieh et al. | |

OTHER PUBLICATIONS

PCT/US2013/067272 International Search Report and Written Opinion Mailed Jun. 16, 2014.

PCT/US2014/029776 International Search Report and Written Opinion Mailed Jul. 24, 2014.

* cited by examiner

SYSTEMS AND METHODS FOR MESSAGE DELIVERY TO MOBILE DEVICES SUPPORTING MULTIPLE USERS

CROSS-REFERENCE TO RELATED APPLICATIONS

This application claims priority and the benefit under 35 U.S.C. §119(e) of U.S. Provisional Patent Application No. 61/719,774, filed 29 Oct. 2012, of which the entire contents and substance are hereby incorporated by reference as if fully set forth below.

BACKGROUND

Push notification services are in widespread use for sending messages to various computing devices, including mobile devices. For example, a push notification may be sent from a message server to a user's mobile device to notify the user of receipt of a new email message. Push services can reduce the required work of a mobile device by relieving the mobile device of the need to check continuously for new email or other new messages from remote servers.

Conventionally, a single user profile runs on a mobile device. Push messages are received and processed by that user profile whenever transmitted by the message server.

SUMMARY

Various implementations of the disclosed technology may manage push message delivery to computing devices with multiple user profiles, based at least in part on the status of those user profiles.

In one implementation, a computer program product of the disclosed technology may include a non-transitory computer-readable storage medium with instructions executable by one or more processors to perform a method. The method may include receiving, at a message server or other computing system configured to receive a plurality of messages for a plurality of computing devices, a first message intended for a first user profile. The first user profile and one or more other user profiles may exist on a single computing device. The method may also include receiving a first status update from the first computing device indicating that the first user profile is stopped or non-active, and postponing delivery of the first message to the first computing device, based on the first user profile being stopped or non-active.

In another implementation, a messaging system of the disclosed technology may include a message server or other computing system with a communication interface. The computing system may be in communication with a plurality of mobile devices, including a first mobile device having two or more user profiles. The computing system may be configured to receive a plurality of messages, to identify a first message as being directed to a first user profile, and to determine that the first user profile exists on the first computing device. The communication interface may receive a plurality of status updates from the plurality of mobile devices, including a first status update from the first computing device, where the first status update indicates whether the first user profile is in a stopped state or in a running state. The computing system may postpone delivery of the first message if the first status update indicates that the first user profile is in the stopped state, and may transmit the message to the first computing device if the first status update indicates that the user profile is in the running state.

In another implementation, a messaging method of the disclosed technology includes associating a first user profile and a second user profile with a message server or other computing device. The first user profile may have a first set of applications and preferences, and the second user profile may have a second set of applications and preferences. A first instance of an application may exist in the first user profile, and a second instance of the application may exist in the second user profile. The method may further involve receiving a first message from an application server associated with the application, where the first message identifies the first instance of the application; determining that the first instance of the application is on the first user profile; receiving from the computing device a current status of the first user profile and the second user profile; and determining when to deliver the first message to the computing device based on the current status of the first user profile.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
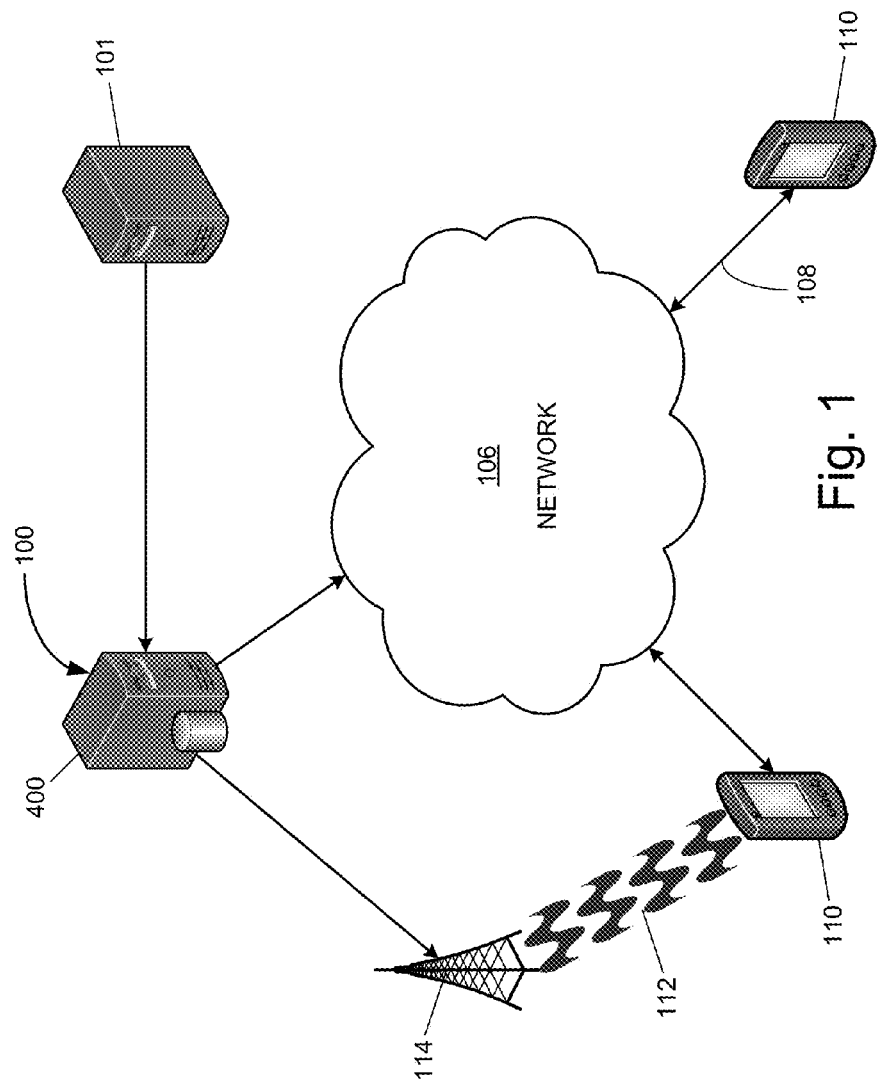
FIG. 1 is a block diagram of an illustrative messaging system according to an example implementation.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Many mobile devices currently use push messaging to receive data. A push message is data transmitted to the mobile device without prompting, or without the mobile device first having to check for messages. A message may be directed to a mobile device from, for example, an application server remote from the mobile device. In some instances, the message may be transmitted from the application server to a message server, which may manage message delivery for a plurality of mobile devices receiving push messages from a plurality of sources.

In conventional messaging systems, push messages are transmitted from the message server to the recipient mobile devices upon receipt of the messages at the message server. This generally occurs without purposeful delay. As a result, mobile devices receive their messages efficiently, without having to prompt the message server to determine whether messages are waiting. A drawback of conventional messaging systems is that transmitting messages requires turning on a radio of the mobile device, which may drain the battery.

A mobile device may have more than one user profile. Each user profile may represent a different user, or virtual user, of the mobile device. Each user may experience a different state of the user device, where that state is customized with the associated user's applications, preferences, or workspace arrangements. A first user having a first user profile on a mobile device may see a different set of applications than are seen by second user having a second user profile on the same mobile device. In an example implementation, all or a portion of the second user's data in the second user profile may be inaccessible by the first user in the first user profile. In an example implementation, each user of a mobile device may have his own user name and password, and may be required to authenticate himself to the mobile device to access his user profile.

In a device with multiple user profiles, a particular user profile may be an active profile, a background profile, or a stopped profile. An active profile may be the user profile that is currently in use on the mobile device. A background profile may be a user profile that is not an active user but is running in the background and may therefore be able to receive messages. In some implementations, no more than a single user profile may be active on a computing device at a time. For the sake of this disclosure, user profiles that are not the active profile, but are instead either running or stopped, will be referred to as "non-active" or in a "non-active" state. Both active and background profiles may be currently running and able to process data on the mobile device.

A stopped profile may be a user profile for which data exists on the mobile device, although the profile is not currently running. Although it might be desirable to keep all user profiles running on a mobile device, this is not always practical. Because each user profile may have its own processes, running multiple user profiles at once may drain battery power and tax the mobile device's processor. Thus, the mobile device may stop a background user profile in order to provide better performance or longer battery life. A stopped user profile may be unable to process messages received. This can be especially problematic because, after a message is pushed down from the message server once, the message server may not push it down at a later time. As a result, messages pushed to stop user profiles may be lost.

The existence of multiple user profiles can add further considerations to the messaging system's role of managing message delivery.

The disclosed technology recognizes that messages need not always be delivered immediately and, in some cases, cannot be delivered immediately. A messaging system of the disclosed technology may hold messages at the message server if such messages are directed to stopped user profiles.

Referring now to the figures, in which like reference numerals represent like parts throughout the views, various implementations of the messaging systems and methods will be described in detail.

FIG. 1 is a block diagram of an illustrative messaging system 100 according to the disclosed technology. The messaging system 100 may be embodied, in whole or in part, in a message server 400 in communication with one or more application servers 101. The message server 400 may be or include a computer system, such as that illustrated in FIG. 4.

Referring to FIG. 1, the message server 400 may receive messages from the application server 101. The application servers 101 may be servers supporting applications installed on, or running on, the computing devices 110. The message server 400 may communicate the received messages by push messaging to various computing devices 110, such as a mobile device, desktop computer, or laptop computer.

It will be understood that there are numerous categories of computing devices 110, including mobile devices, with multiple user profiles may benefit from the disclosed technology. For example, computing devices 110 can include, but are not limited to, portable computers, tablets, Internet tablets, netbooks, e-readers, personal data assistants, ultra mobile personal computers, and smartphones.

The message server 400 may communicate with the computing device 110 in various ways. For example, the message server 400 may communicate with the computing device 110 through a Wi-Fi channel or another Internet connection 108, and may utilize a network 106 for communication with the computing device 110. For another example, the message server 400 may communicate to the computing device 110 through a service provider 114, such as a cellular service provider or other network provider supporting mobile devices. The service provider 114 may provide cellular service through cellular radio channels 112 for communicating with the computing device 110. In that case, the message server 400 may communicate or send messages to the computing device 110 through the service provider 114.

The message server 400 may be in communication with a plurality of computing devices 110 belonging to a plurality of users. One or more of these computing devices may have multiple user profiles, as discussed above. Further, the message server 400 may receive a plurality of messages for the various user profiles. The message server 400 may sort the received messages and associate each message with its intended-recipient user profile.

Instead of delivering all messages to the appropriate computing devices 110 of the user profiles immediately upon receipt, the message server 400 may batch certain messaging for future deliver, and may deliver other messages as soon as possible.

Figure 2:
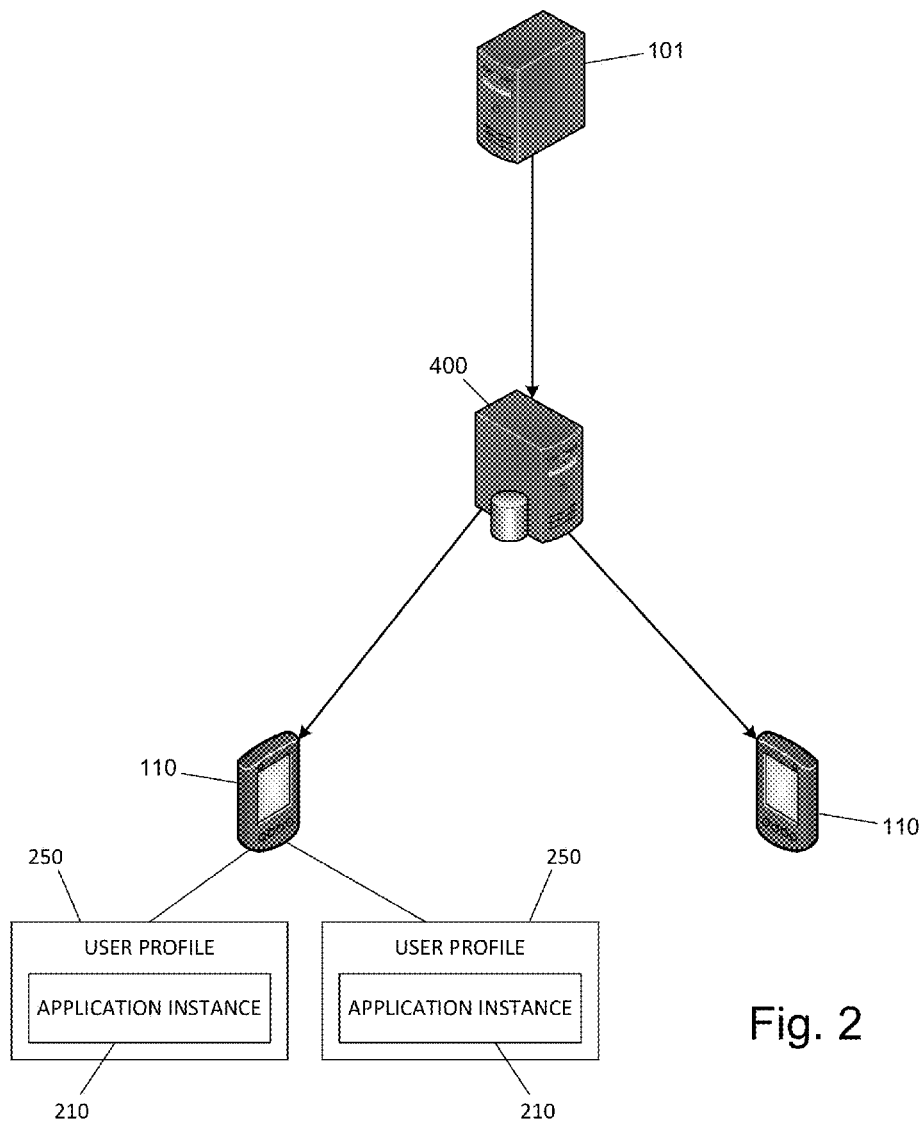
FIG. 2 is a bock diagram of the messaging system where multiple instances of an application exist on a mobile device, according to an implementation.

FIG. 2 is a block diagram of the messaging system 100 where multiple instances of an application exist on a mobile device, according to an implementation of the disclosed technology. As shown in FIG. 2, multiple instances 210 of a single application may run on a single computing device 110, where each application instance 210 is associated with a distinct user profile 250 on the computing device 110. From the view of the application server 101, each application instance 210, regardless of which computing device 110 runs that instance, registers with the application server 101 and has a unique registration identifier.

In some example implementations, the application server 101 is unaware of, or unconcerned with, the use of multiple user profiles 250 on the computing devices 110. The application server 101 may recognize application instances by their registration identifiers, and not by their particular computing devices 110. Further, in some implementations, the message server 400 may assign the registration identifiers and communicate them to the application server 101. In that case the registration identifiers can encode user identifiers, identifying the associated user profiles 210.

When the application server 101 desires to communicate with a particular instance 210 of its associated application, the application server 101 may transmit a message to the message server 400 indicating the registration identifier of the intended application instance 210. The message server 400 may receive the message from the application server 101, and may process the message for delivery.

The message server 400 may be aware of the user profiles on the various computing devices 110 with which it is in communication. The message server 400 may associate each computing device 110 with a device identifier, and may associate each user profile with a user identifier. It will be understood that, assuming each computing device 110 has at least one user profile 250, there will exist at least as many user identifiers as device identifiers. Further, each device identifier may be associated with one or more user identifiers, while each user identifier may be associated with only a single device identifier.

For each application server 101, the message server 400 may include, or otherwise have access to, data for translating the registration identifiers used by the application server 101 to user identifiers of user profiles 250 running the various application instances. For example, this data may be stored in a database, which may be implemented in various ways, and need not be limited to a relational database. When the message server 400 receives a message from the application server 101, including or accompanied by a registration identifier, the message server 400 may translate the registration identifier into the user identifier representing the user profile 250 running the application instance 210 represented by the registration identifier.

At this point, the message server 400 now has the message and may associate it with a user profile 250 and a computing device 110. Because a stopped user profile 250 is unable to receive messages, the message server 400 may hold messages for stopped profiles 250, and may deliver messages for running profiles 250. In some implementations, the message server may also, or alternatively, hold messages for background user profiles 250.

In an example implementation, the message server 400 may have access to status information related to the computing device 110. For example, and not limitation, this status information may be received at a communication interface 480 (FIG. 4) of the message server 400 from the various computing devices 110. Each computing device 110 may send information about its current state to the message server 400. The information may be sent either at the prompting of the message server 400 or, alternatively, autonomously by the computing device 110.

For example, and not limitation, the computing device 110 may send in its updates to the message server 400 information about its user profiles 250. More specifically, the computing device 110 may notify the message server 400 of any new user profiles 250, and may notify the message server 400 of one or more of the following: which user profiles are running, which are active, which are in the background, and which are stopped. In some example implementations, the computing device 110 may provide updates in the form of changes since the prior update. In other words, the computing device 110 may indicate which user profiles 250 have switched their states, and the current states of such user profiles 250. Such updates may occur automatically when a change is made to a user profile 250 on the computing device 110.

Based on status information received from the various computing devices, the message server 400 may have access about the states of the various user profiles 250 across the computing devices 110. When a message is received from an application server 101, the message server 400 may determine, from the prior computing device updates, whether the intended-recipient user profile 250 is stopped. The message server 400 may hold messages, i.e., not transmit them to their intended recipients, until the intended-recipient user profile 250 is running.

If the message server 400 determines that the intended-recipient user profile 250 is running, the message server 400 may determine which computing device 110 runs that user profile 250, and may transmit the message to that computing device 110. This transmission may occur without purposeful delay from the message server 400.

If the message server 400 determines that the intended-recipient user profile 250 is stopped, the message server 400 may hold on to the message for the time being. If multiple messages for a stopped user profile 250 are received, the message server may hold on to all of such messages for the time being. When the message server 400 receives indication from the computing device 110 associated with the intended-recipient user profile 250 indicates that the user profile 250 in question is no longer stopped, the message server 400 may then transmit, or flush, the one or more held messages intended for that computing device 110 for the intended-recipient user profile 250.

In some implementations, message server 400 may hold messages for all non-active user profiles 250. In that case, the message server 400 may hold a message until the intended-recipient user profile 250 is deemed to be active, based on updates from the associated computing device 110. If multiple messages for a stopped or background user profile 250 are received in such an implementation, the message server 400 may hold on to all of such messages until the user profile 250 is deemed by the message server 400 to be active.

When the intended-recipient user profile 250 is in the appropriate state to receive messages (i.e., active or running, depending on the implementation), the message server 400 may transmit the one or more previously held messages to that user profile. When the computing device 110 receives one or more messages for a user profile 250, that user profile 250 may capture and process the one or more messages.

In some instances, a race condition may exist, in that the message server 400 may transmit a message to a computing device 110 for a user profile 250 that has just stopped. In that case, the message server 400 may not yet have received notification from the computing device 110 that the user profile 250 stopped. In these instances, the computing device 110 may recognize upon receiving the message that it is for a user profile 250 that is not running on the computing device 110. As a result, the computing device 110 may notify the message server 400 that the message was not delivered. The message server 400 may then retain the message for future delivery in accordance with the disclosed technology. This may prevent losing messages transmitted to stopped user profiles 250 that are unable to process them.

Figure 3:
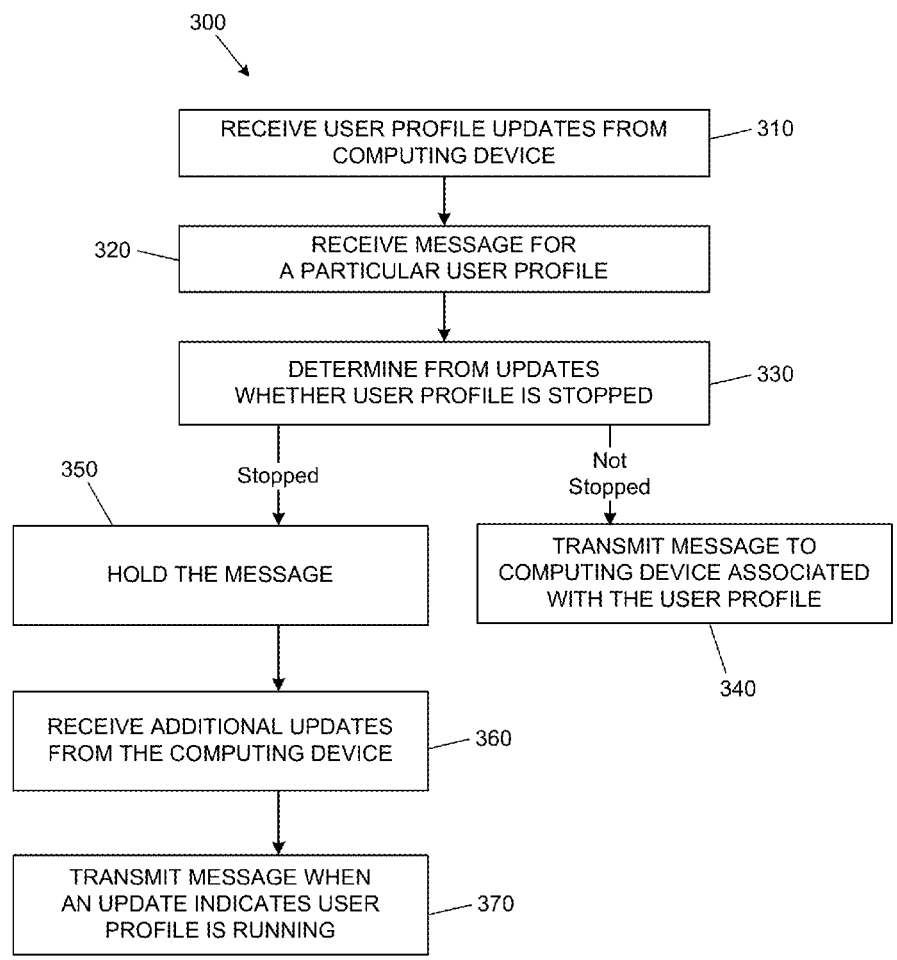
FIG. 3 is a flow diagram of a method for managing message delivery, according to an implementation.

FIG. 3 illustrates a flow diagram of a method 300 according to the disclosed technology. As shown, at 310, the computing system 400 may receive user profile updates, such as whether user profiles are running or stopped, from one or more computing devices 110. At 320, a message is received by the computing system 400 for a particular user profile. At 330, the computing system may determine whether the user profile is currently running or stopped. At 340, the computing system 300 may transmit the message to the computing device 110 associated with the user profile if the user profile is not deemed to be currently stopped. At 350, the computing system 400 may hold the message if the user profile is deemed to be currently stopped. At 360, additional user profile updates may be received by the computing system 400. At 370, when at least one of these updates indicates that the user profile is running, the computing system 400 may deliver the previously-held message to the computing device 110 for the user profile.

Figure 4:
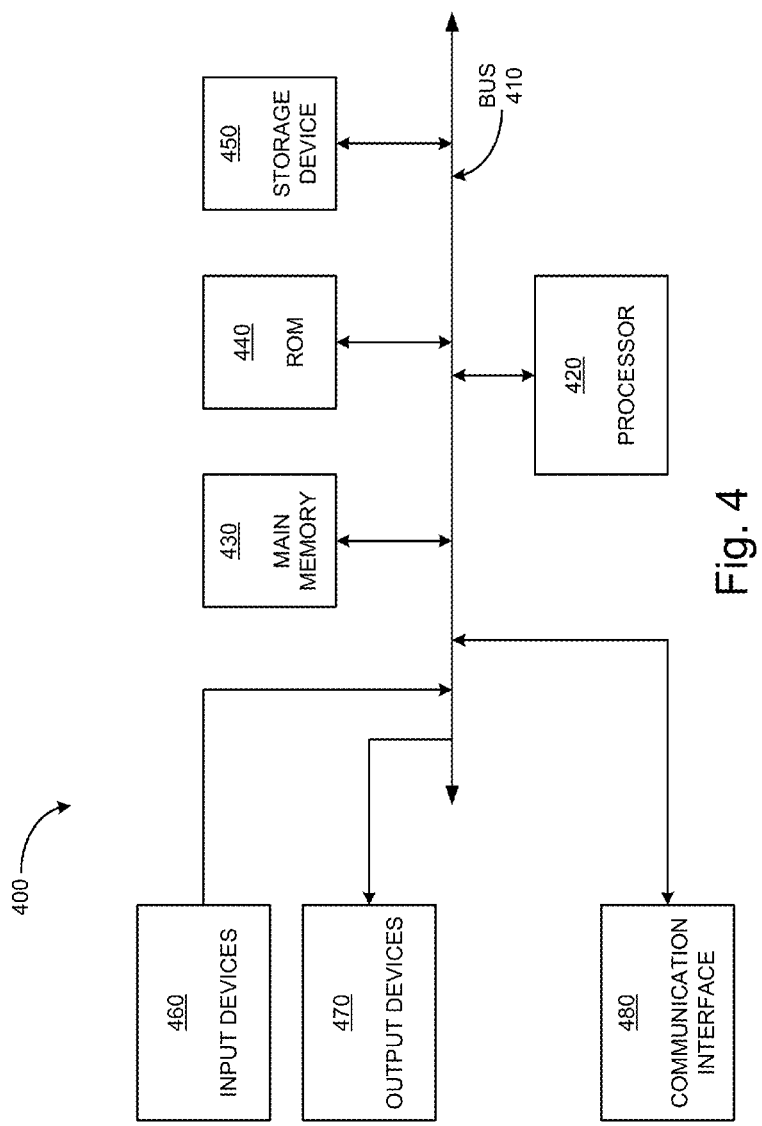
FIG. 4 is a diagram of an architecture of a computing system, according to an implementation.

It will be understood that the various steps shown in FIG. 4 are illustrative only, and that steps may be removed, other steps may be used, or the order of steps may be modified. It will also be understood that user profile updates from the computing device 110 may be received at various points throughout the method 300, especially if provided autonomously by the computing device 110.

Various implementations of the messaging systems 100 and methods may be embodied in transitory or non-transitory computer readable media for execution by a computer processor. FIG. 4 is a diagram of an example architecture of a message server 400, in an implementation consistent with the disclosed technology. As shown, the message server 400 may include a bus 410, a processor 420, a main memory 430, a read only memory (ROM) 440, a storage device 450, one or more input devices 460, one or more output devices 470, and a communication interface 480. The bus 410 may include one or more conductors that permit communication among the components of the message server 400.

The processor 420 may be one or more conventional processors or microprocessors that interpret and execute instructions, such as instructions for providing aspects of the disclosed technology. The main memory 430 may include a random access memory (RAM) or another dynamic storage device that stores information and instructions for execution by the processor 420. The ROM 440 may include a conventional ROM device or another type of static storage device that stores static information or instructions for use by the processor 420. The storage device 450 may include a magnetic or optical recording medium and its corresponding drive.

The input devices 460 may include one or more mechanisms that permit an operator to input information to the message server 400, such as a keyboard, a mouse, a pen, voice recognition, or biometric mechanisms. The output devices 470 may include one or more mechanisms that output information to an operator, including a display, a printer, or a speaker. The communication interface 480 may include any transceiver-like mechanism that enables the message server 400 to communicate with remote devices or systems, such as a mobile device or other computing device 110 to which messages are delivered. For example, the communication interface 480 may include mechanisms for communicating over a network.

As discussed above, the message server 400 may manage message delivery to a plurality of computing devices 110. The message server 400 may perform tasks to that end in response to the processor 420 executing software instructions contained in a computer-readable medium, such as memory 430. The software instructions may be read into memory 430 from another computer-readable medium, such as the data storage device 450, or from another device via the communication interface 480. Alternatively, or additionally, hardwired circuitry may be used in place of or in combination with software instructions to implement processes consistent with the disclosed technology. Thus, the disclosed technology is not limited to any specific combination of hardware circuitry and software.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer program product comprising a non-transitory computer-readable storage medium with instructions that, when executed by one or more processors, cause the one or more processors to perform a method, the method comprising:

receiving a first status update from a first computing device indicating that a first user profile is a non-active profile, wherein the first user profile and one or more other user profiles exist on the first computing device and a non-active profile is a profile that is not currently in use on the first computing device;

receiving, at a computing system configured to receive a plurality of messages for a plurality of computing devices, a first message of the plurality of messages being intended for the first user profile;

postponing, based on the first user profile being a non-active profile, delivery of the first message to the first computing device;

receiving a second status update from the computing device indicating that the first user profile is an active profile, wherein an active profile is a profile that is currently in use on the first computing device; and pushing, in response to receiving the second status update, the first message to the first computing device.

2. The computer program product of claim 1, wherein the first status update indicates that the first user profile is running in the background.

3. The computer program product of claim 1, wherein the first status update indicates that the first user profile is stopped.

4. The computer program product of claim 3,
wherein the first status update further indicates that a second user profile is an active user profile on the first computing device, and
wherein the method further comprises:
receiving a second message intended for the second user profile on the first computing device; and
pushing the second message to the first computing device, based on the second user profile being an active profile, while still postponing delivery of the first message.

5. The computer program product of claim 4, wherein the second status update further indicates that the second user profile is a non-active user profile on the first computing device.

6. The computer program product of claim 3, the method further comprising:
receiving, after receiving the first status update, a plurality of additional messages intended for the first user profile;
determining that the first user profile remains a non-active profile on the first computing device; and
postponing, based on the first user profile being a non-active profile, delivery of the plurality of additional messages to the first computing device.

7. The computer program product of claim 6, the method further comprising:
pushing, in response to receiving the second status update, the plurality of additional messages to the first computing device with the first message.

8. The computer program product of claim 1, the method further comprising receiving a plurality of additional status updates from the first computing device indicating the current states of the first user profile and the one or more other user profiles.

9. The messaging system of claim 1,
wherein the computing system is further configured to, based on the first status update indicating that first user profile is a non-active profile, collect a plurality of messages for the first user profile, and to postpone delivery of the plurality of messages at least until receipt of the second status update indicating that the first user profile is an active profile.

10. The messaging system of claim 1, wherein the first user profile is unable to process the first message when the first user profile is a non-active profile.

11. The computer program product of claim 1, wherein no more than one of the first user profile and the one or more other user profiles may be an active profile in the first computing device at a single point in time.

12. A messaging system comprising:
a computing system configured to communicate with a plurality of mobile devices, including a first mobile device having two or more user profiles existing thereon, the computing system being configured to receive a plurality of messages, to identify a first message as being directed to a first user profile, and to determine that the first user profile exists on the first mobile device; and
a communication interface configured to receive a plurality of status updates from the plurality of mobile devices, including a first status update from the first mobile device, wherein the first status update indicates whether the first user profile is an active profile or a non-active profile, wherein an active profile is a profile that is currently in use on the first computing device and a non-active profile is a profile that is not currently in use on the first computing device;
wherein the computing system is further configured to
postpone, based on the first status update indicating that first user profile is a non-active profile, delivery of the first message at least until receipt of a second status update from the first mobile device indicating that the first user profile is an active profile, and
transmit, based on the first status update indicating that the first user profile is an active profile, the first message to the first mobile device.

13. A method comprising:
associating a first user profile and a second user profile with a computing device, wherein the first user profile has a first set of applications and preferences and the second user profile has a second set of applications and preferences, and wherein a first instance of a first application is in the first user profile and a second instance of the first application is in the second user profile;
receiving from the computing device a current status of the first user profile and the second user profile, the current status indicating whether the first user profile and the second user profile is an active profile or a non-active profile, wherein an active profile is a profile that is currently in use on the first computing device and a non-active profile is a profile that is not currently in use on the first computing device;
receiving a first message from an application server associated with the application, the first message identifying the first instance of the first application;
determining that the first instance of the first application corresponds to the first user profile;
postponing, based on the first user profile being a non-active profile, delivery of the first message to the computing device;
receiving, from the computing device, an update to the current status of the first user profile; and
scheduling, based on the updated current status of the first user profile indicating that the first user profile is an active profile, delivery of the first message to the computing device.

14. The method of claim 13, further comprising:

receiving a second message from the application server associated with the first application, the second message identifying the second instance of the first application;

determining that the second instance of the first application corresponds to the second user profile; and scheduling, based on the second user profile being an active profile, delivery of the second message to the computing device, but not the first message.

15. The method of claim 13, further comprising:

receiving a second message from the application server associated with the first application, the second message identifying the second instance of the first application;

determining that the second instance of the first application corresponds to the second user profile; and transmitting, based on the second user profile being an active profile and the first user profile being a non-active profile, the second message to the computing device.

16. The method of claim 13, further comprising transmitting the first message to the computing device.

17. The method of claim 16, further comprising including an indication with the transmission of the first message that the first message is intended for the first user profile.

* * * * *